(12) United States Patent
Ray et al.

(10) Patent No.: US 6,829,249 B1
(45) Date of Patent: Dec. 7, 2004

(54) VOICE-OVER INTERNET PROTOCOL

(75) Inventors: Jerry Ray, Chandler, AZ (US); Ray Campbell, Gilbert, AZ (US)

(73) Assignee: Inter-Tel, Inc., Tempe, AZ (US)

( * ) Notice: Subject to any disclaimer, the term of this patent is extended or adjusted under 35 U.S.C. 154(b) by 697 days.

(21) Appl. No.: 09/666,758

(22) Filed: Sep. 21, 2000

(51) Int. Cl.[7] .......................... H04J 3/16; H04L 12/66
(52) U.S. Cl. ............................... 370/466; 370/352
(58) Field of Search ................................ 370/352–356, 370/389, 395.52, 401, 402, 465–467

(56) References Cited

U.S. PATENT DOCUMENTS

| | | | |
|---|---|---|---|
| 4,592,048 A | 5/1986 | Beckner | |
| 4,596,010 A | 6/1986 | Beckner | |
| 4,764,919 A | 8/1988 | Hunter | |
| 5,410,754 A | 4/1995 | Klotzbach | |
| 5,526,353 A | 6/1996 | Henley | |
| 5,537,401 A | 7/1996 | Tadamura | |
| 5,550,906 A | 8/1996 | Chau | |
| 5,796,729 A | 8/1998 | Greaney | |
| 5,796,742 A | 8/1998 | Klotzbach | |
| 5,878,117 A | 3/1999 | Minakami | |
| 5,892,764 A | 4/1999 | Riemann | |
| 5,923,655 A | 7/1999 | Veschi | |
| 5,940,479 A | 8/1999 | Guy | |
| 6,046,762 A | 4/2000 | Sonesh | |
| 6,064,673 A | 5/2000 | Anderson | |
| 6,154,465 A * | 11/2000 | Pickett | 370/466 |
| 6,396,849 B1 * | 5/2002 | Sarkissian et al. | 370/490 |
| 6,445,697 B1 * | 9/2002 | Fenton | 370/357 |
| 6,532,286 B1 * | 3/2003 | Burg | 379/209.01 |
| 6,535,505 B1 * | 3/2003 | Hwang et al. | 370/352 |
| 6,584,108 B1 * | 6/2003 | Chung et al. | 370/401 |
| 6,614,780 B2 * | 9/2003 | Hakim et al. | 370/352 |

* cited by examiner

Primary Examiner—Alpus H. Hsu
Assistant Examiner—Toan D. Nguyen
(74) Attorney, Agent, or Firm—Michelle Whittington

(57) ABSTRACT

A system and method is designed for upgrading a digital PBX used with a pulse code modulation (PCM) telephone system by providing an interface card connected to the back plane of the PBX. The interface card acts as a replacement for the digital key set cards normally used with the back plane of such a PBX. The interface card is designed with circuitry to process voice-encoded packet data directly from a LAN to the PCM data used within the PBX network, and to process PCM data from the telephone network to voice coded packet data on the LAN to provide a voice-over Internet protocol and interface with the telephone system connected with and controlled by the PBX.

16 Claims, 2 Drawing Sheets

VOICE-OVER INTERNET PROTOCOL

BACKGROUND OF THE INVENTION

Telecommunications switching systems typically are utilized by business users to place telephone calls within their offices, or to other users, by way of a network of telephone systems and communication devices. Currently, many businesses employ a combination of computer networks and telephone systems. Such businesses are faced with a never-ending series of complex decisions as the businesses grow and evolve. The reason for this is that the increasing demands on both the computer and telephone systems require both of these systems to undergo major upgrades over a period of time, generally with associated significant budgetary impacts.

The traditional recommendation for such business customers is to somehow integrate their voice and data traffic onto one network to simplify the planning and procurement process, especially when considering the impact that video and other wide band communications demands will have on their network transport requirements. This approach regards voice communications as a constantly decreasing percentage of data and video communications, and recommends that the network be designed for the most demanding traffic source to allow for the relatively low bandwidth voice traffic to ride along with it.

Systems also exist which allow off-site workers to access resources over the local area network (LAN); but expensive computer server and data routing arrangements are required to accomplish this. This complex arrangement also is expensive to maintain and continuously update.

Known systems generally propose one of two solutions. One is to utilize a private branch exchange (PBX) system which has a packet data network built into it, along with voice switching apparatus. Another is to upgrade the on-site LAN to a sufficient performance level that the LAN can act as a pathway for communications between multimedia devices and still maintain a reasonable quality of voice service.

Such prior art systems, however, lack an interim migration plan for smaller business customers who have relatively limited financial resources. The absence of such an interim plan begs for a more efficient mechanism to migrate a business to multimedia communications and e-commerce applications economically. The solutions which are provided by the known systems do not allow for a gradual migration to advanced networking techniques for customers with limited resources.

United States patents which are related to the technologies discussed above are Hunter U.S. Pat. No. 4,764,919; Beckner U.S. Pat. No. 4,592,048; Beckner U.S. Pat. No. 4,596,010; Tadamura U.S. Pat. No. 5,537,401; and Minakami U.S. Pat. No. 5,878,117. These patents cover interface and control arrangements to bridge between traditional telecommunications networks and packet data networks, for the purpose of combining the positive aspects of both network types, to provide improved communication solutions for customers.

Other prior art patents cover usage of various LAN protocol enhancements to make the quality of encoded voice messages better, so as to reduce user objections about choppy speech, audible delays and audio distortion. Such techniques include changes to the timing of sending LAN packets, as disclosed in the U.S. Pat. No. 6,064,673 to Anderson. Two other United States patents which are directed to techniques for assembling and disassembling voice packets more efficiently are the U.S. Pat. No. 5,923,655 to Veschi and U.S. Pat. No. 5,526,353 Henley.

Some systems are designed to establish direct links from digital telephone facilities normally used for voice to data network sources. These systems provide for data transmission over existing T-1 and PRI telephone trunks. Two such systems are disclosed in the U.S. Pat. Nos. 5,410,754 and 5,796,742 to Klotzbach. Essentially the disclosure of both of these patents is the same. The solution, however, is simply to take data and transmit it over a voice channel. There is no packetizing of voice information for transmitting that information over a LAN network.

Another solution is proposed in the U.S. Pat. No. 5,892,764 to Riemann. This patent discloses packet switching using the LAN to serve as a communication link for a complete PBX system, which does not use a central switching chassis. This is a solely digital system designed as a substitution for a pulse code modulated (PCM) PBX system. For a business customer having a digital PBX operating with PCM voice, the system of this patent offers no solution, other than removing the PBX and substituting the digital system of Riemann.

Product enhancements have been introduced for customers who desire to continue use of a PBX to transport multimedia information, such as voice data and video. Enhancement products of this type generally include function cards that combine audio and data from both a LAN and wide area network (WAN) interface for switching within the PBX. Three such United States patents for this type of a system are Guy U.S. Pat. No. 5,940,479; Chau U.S. Pat. No. 5,550,906; and Greaney U.S. Pat. No. 5,796,729. The Greaney patent employs cards which are plugged into the back plane bus of a digital PBX. The system, however, requires a variable bandwidth back plane to permit the back plane to be used for voice, data, and control signals.

While the various systems of the prior art discussed above provide a number of techniques for combining LAN data and PCM voice data, none of these systems are directed to the needs of customers who already own a PBX, but want a convenient and inexpensive means to switch (and convert) voice encoded packet data directly between a LAN and PCM data used within the PBX network. It is desirable to provide such a system, which is cost effective and which comprises a drop-in module to make existing PBX voice traffic available to network devices that are capable of sending voice over LANs.

SUMMARY OF THE INVENTION

It is an object of this invention to provide an improved voice-over Internet protocol system.

It is another object of this invention to provide an improved apparatus and method to create complete connectivity between devices on a LAN with communications and control channels within the existing telephone system while permitting communication over other wide area networks (WAN).

It is an additional object of this invention to cause an existing digital key or PBX system to be accessible by personal computers and other devices connected to a LAN without requiring changes in the software present in the existing PBX system.

It is a further object of this invention to provide an interface card to allow an owner of a digital PBX system to implement a drop-in replacement of existing telephones, with telephones directly connected to the LAN while continuing to permit operation of the PBX with standard digital key sets.

In accordance with a preferred embodiment of the invention, a system and method are disclosed for adapting a pulse code modulation (PCM) telephone system having a PBX with a back plane bus to transport information to and from an Ethernet data network or LAN. To do this, an Internet protocol card (IPC) is coupled to the back plane bus of a digital PBX system in the same manner as digital key set cards normally used with such a PBX. The IPC includes a plurality of digital signal processors and a digital cross point switch coupled in parallel with the digital signal processors, and with the PBX back plane, for routing PCM voice data to and from the digital signal processors. The digital signal processors are controlled by known algorithms to packetize the PCM voice data coming from the PBX and to de-packetize, into PCM voice data, packetized voice supplied to the IPC card from a port connected to the LAN. Power, timing and control interconnections for operating the Internet protocol card are obtained from the back plane.

DETAILED DESCRIPTION

Figure 1:
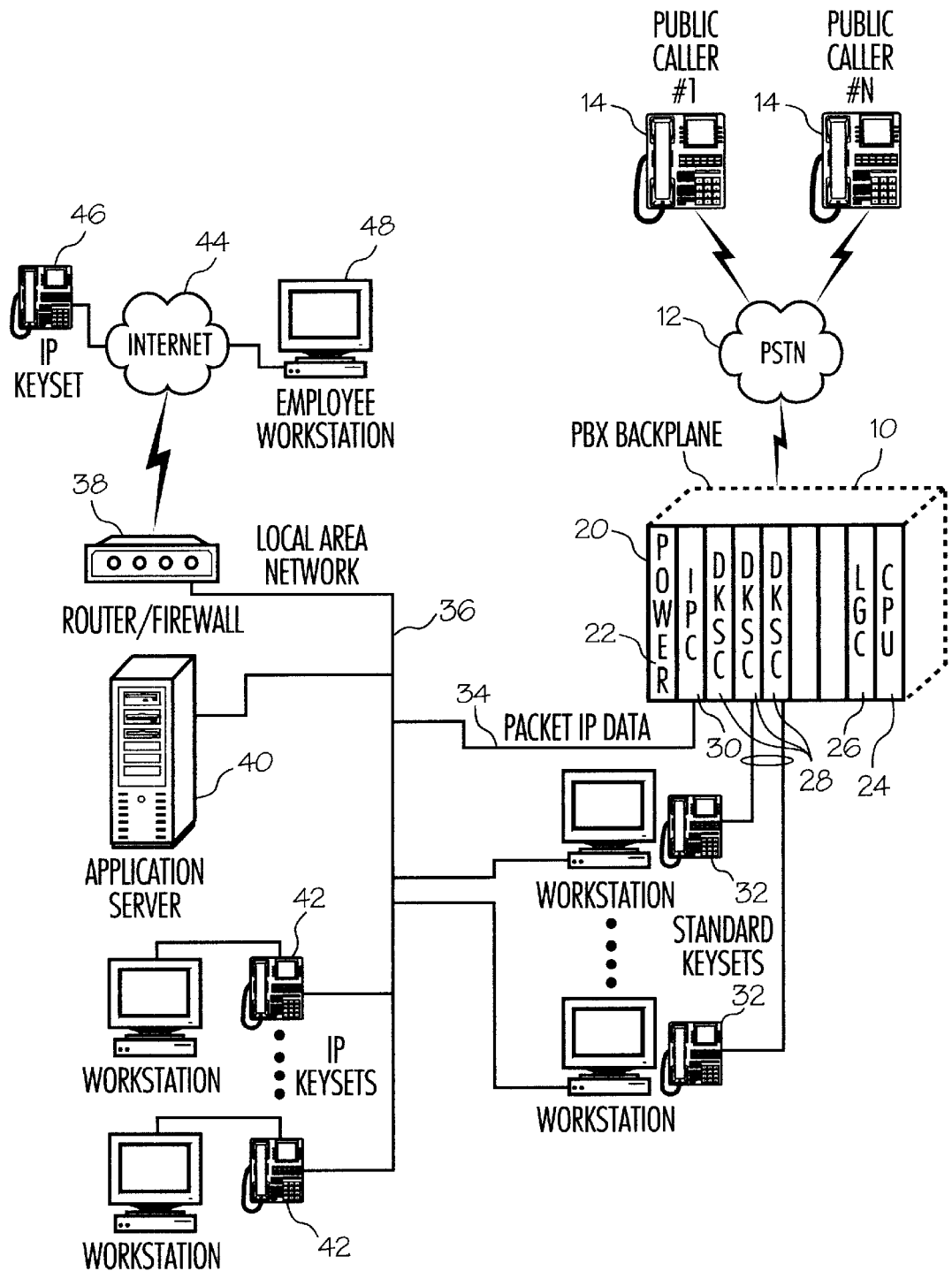
FIG. 1 is a block diagram illustrating the major systems of the present invention and their connection to and through a standard digital PBX.

Reference now should be made to the drawings, in which the same reference numbers are used in both figures to designate the same components. The system of the preferred embodiment of the invention is designed to function as an interface card with a conventional digital PCM voice PBX, such as those available through Inter-Tel Corporation for the AXXESS® key systems. Such a PBX has a number of digital key sets, shown as standard key sets 32 in FIG. 1; and these key sets are connected with the backplane 20 of the PBX 10 through digital key set cards 28 (three of which are shown in FIG. 1). The PBX 10 may be configured to handle a relatively small number of lines, up to several hundred. As shown in FIG. 1, the PBX 10 also is connected through the public switched telephone network (PSTN) 12, through which connections may be made to any number of public telephones or public callers 14, as indicated in FIG. 1. In a conventional PCM PBX system of the type described thus far, the standard key sets 32 are linked with one another and to the public switched network 12, through the operation of the PBX, and specifically, are linked through the backplane 20 of the PBX 10. The PBX 10 functions as an interface between the public network and the business network using the digital key sets 32.

To permit communication with, and interconnection of, the PBX 10, along with the standard key sets 32, to station apparatus on the Ethernet or LAN which use a TCP/IP data network, an Internet protocol card (IPC) 30 is plugged into or added to the back plane 20 of the PBX 10 in place of, or in addition to, one of the digital key set cards 28. The manner in which this card 30 plugs into and interfaces with the back plane 20 is the same as the interconnections made by the digital key set cards 28. It also should be noted that other cards are typically plugged into the back plane 20 of the PBX 10, such as the (central processing unit) CPU 24, (loon and around start controller) LGC 26, power 22, and the like. The back plane bus 20 of the PBX 10 serves to interconnect all of these functions and to synchronize the operation of the entire system to which it is connected. This includes the IPC 30.

It should be noted that no changes whatsoever are made to the standard PBX back plane 20, which has a bandwidth of 64 kilobit/second pulse code modulation (PCM) data streams present within the phone system. The Internet protocol card (IPC) 30 operates to convert this 64 kilobit/second data stream to TCP/IP Ethernet packets, which contain encoded voice at the rate of 8 kilobit/second. As a consequence, as indicated, in FIG. 1, packetized IP data is supplied from the IPC card 30 over a trunk 34 to a local area network (LAN) 36, which may have connected to it application servers 40 and IP key sets and work stations 42, which operate on packetized data in the LAN. In addition, the LAN 36 is connected through a conventional router/firewall 38 to the wide area network (WAN), shown as the Internet 44, for communication with employee work stations 48 and IP key sets 46 operating in and through the WAN.

In the system shown in FIG. 1, information from the WAN and LAN to the standard key sets associated with the PBX 10, as well as through the PBX 10 to stations 14 on the PSTN 12, may be effected. As far as voice messages are concerned, the system is essentially transparent to the users, with the change over from PCM voice data to packetized TCP/IP voice, and vice versa, being effected automatically through the IPC which is simply plugged into the back plane 20 of a standard digital PBX 10, which may be of any conventional configuration, including the one specifically mentioned above.

Figure 2:
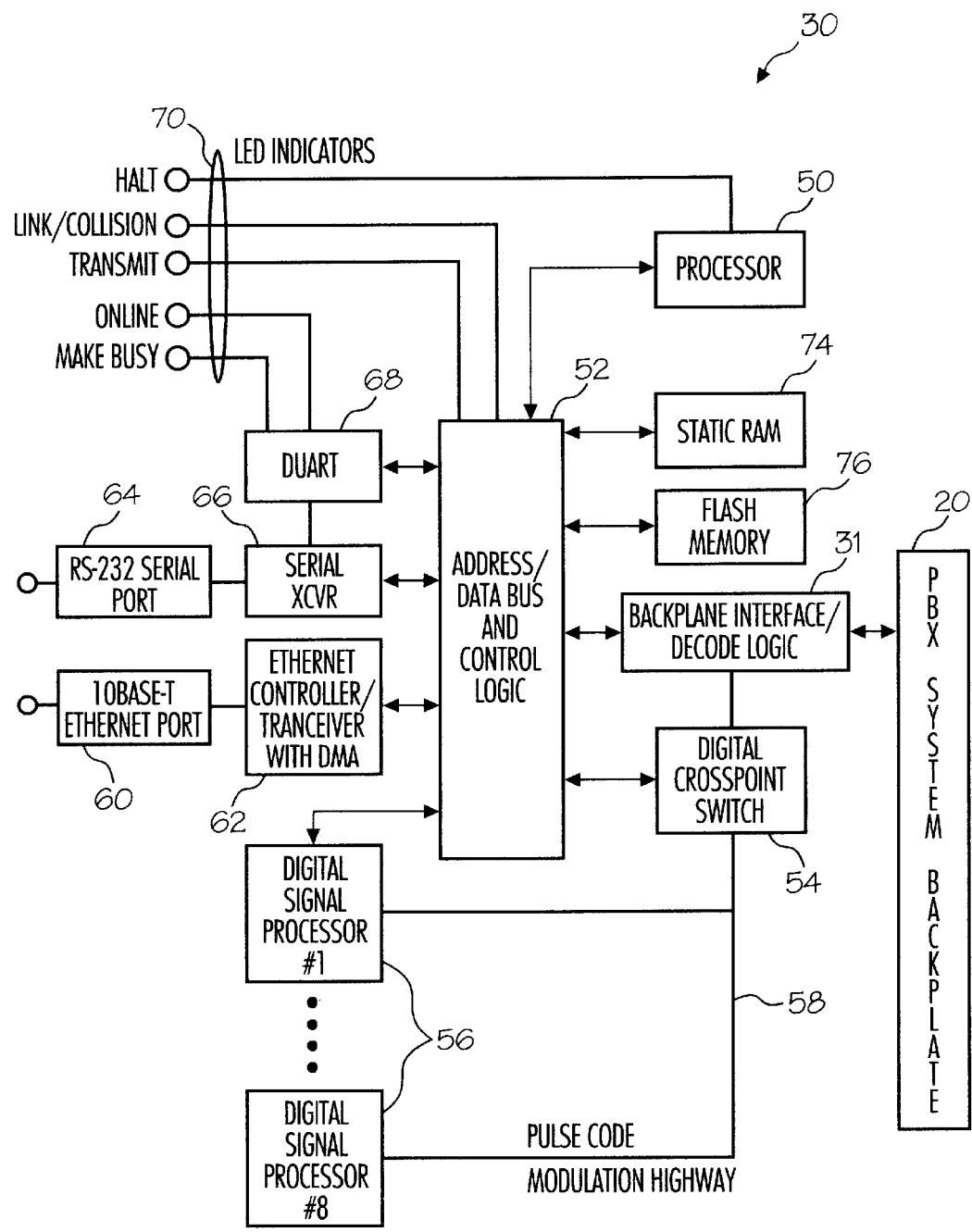
FIG. 2 is a block diagram of a preferred embodiment of the invention.

Reference now should be made to FIG. 2, which is a detailed block diagram of the IPC card 30. The IPC card 30 is plugged into the back plane 20 of the PBX system 10. As indicated in FIG. 2, the interconnections between the back plane 20 and the IPC card are through a back plane interface/decode logic 31, which, in addition to the interface described above in conjunction with FIG. 1, also directly couples power, timing signals and call processor resources from the PBX back plane 20 to the interface card 30. As a result, substantial savings in equipment costs are effected. In addition, this utilization of all of the internal facilities within the PBX telephone system results in a more reliable solution with fewer overall components, since the IPC card 30 and the other cards and operations of the PBX 10 are fully integrated with one another.

The interconnection to the Ethernet (LAN) is effected through an Ethernet port 60, which is a ten-base-T Ethernet port. This port is coupled to a serial Ethernet IC network interface controller (ST-NIC) 62 in the form of an integrated media access controller (MAC), twisted pair transceiver (PHY), and an attachment unit interface (AIU) which provides ten Mbps throughput over various physical media. The ST-NIC 62 has a small sixteen-byte internal FIFO, but has the capability of being an address and data bus master to transport data to and from the host processor memory by way of the dual sixteen-bit DMA channels.

When it is in the bus/slave mode, the ST-NIC 62 allows the host processor 50 to read and write to the internal registers by way of normal peripheral access (non-latched timing mode). When a bus master (FIFO) is full, the ST-NIC 62 uses the sixteen-bit multiplexed address/data bus to access external memory shared by the host processor 50. A latch is used to capture and hold the driven address while the ST-NIC 62 reads or writes to the addressed memory through an address data bus and control logic block 52.

The controller 62 also provides status outputs through the data bus and control logic 52, indicative of link, transmit and collision. The link and collision data are shown as combined into one LED indicator at 70. Since the link status lights the LED constantly when a valid link is plugged into the Ethernet port 60, the LED display is interrupted when a collision occurs. The transmit LED is illuminated during a transmit mode of operation through the Ethernet port 60.

At this time, it should be noted that three other LED indicators in the group 70 are also shown in FIG. 2. These are "halt", "on-line" and "make busy". The "halt" indication is supplied from the processor 50; whereas the "on-line" and "make busy" indicators are controlled by a DUART 68. The status indicators 70 are provided to give the user a general idea as to the operational state of the IPC card 30. There are also standard connectors to provide interfaces to the customer's network, installer programming terminal, and the telephone system's back plane signals. These standard connectors are not shown, since they are well known and widely used.

A control register in the address/data bus and control logic 52 is used to place the ST-NIC controller 62 in and out of reset. Using bit 0, writing a zero places the ST-NIC 62 in reset. Reading the same register and bit, software is able to monitor the state of the ST-NIC 62 reset signal. Any on card (IPC card 30), system, or software generated reset causes the ST-NIC 62 to default to its reset state.

A key element to the interface provided by the IPC card 30 for converting PCM voice signals to packetized digital signals, and vice versa, is a number of digital signal processors (DSP) 56. As indicated in FIG. 2, eight of the DSP's 56 are provided. This number, however, is arbitrary; and the number eight is a convenient number for many LAN systems. By using eight digital signal processors 56, eight lines over the Ethernet may be employed. If additional lines are required, additional DSPs 56 may be added. It is apparent from an examination of FIG. 2 that the DSPs 56 are connected in parallel with a PCM highway 58. The DSPs 56 are controlled by a digital cross point switch 54 and by the processor 50 through the address/data bus and control logic 52. It should be noted that the DSP's 56 include memory for program RAM and memory for data RAM, along with connections for DMA channels and connections for serial ports.

Voice data from the PBX back plane 20 is transferred through the back plane interface decode logic 31 to the digital cross point switch 54, from which it is routed to the serial port of the DSP's 56. The selected one of the DSP's 56, as chosen by the control logic 52, compresses the PCM voice data using an algorithm downloaded from the host processor 50. The algorithm may be any suitable compression algorithm. Currently, a suitable conversion between PCM voice data and TCP/IP follows the G.729 standard to produce TCP/IP Ethernet packets which contain encoded voice at the rate of eight kilobit/second. Although this is a current conversion algorithm which is widely used, this conversion format is expected to change in accordance with a customer's network requirements. The particular conversion algorithm is not important. The significance, however, is that the digital signal processors 56 convert PCM information into packetized voice information for communication with IP key sets on the LAN and the WAN.

Conversely, when packetized information is supplied to the IPC from the Ethernet port 60, this information again is supplied under the control of the processor 50 through the address/data bus and control logic 52 to the digital signal processors 56 by way of the cross point switch 54, where the packetized data is converted to standard PCM voice on the PCM highway 58. This decoded PCM voice data then is supplied through the cross point switch 54 and the back plane interface decode logic 31 to the PBX back plane for utilization through the PBX with the PSTN or standard key sets 32 associated with the PBX. The DSP's 56 operate to convert data in both directions to provide a seamless interface between the packetized Ethernet (LAN/WAN) voice data and PCM voice data, essentially operating as a bridge between these two different protocols.

It should be noted that synchronization is provided by a modified frame sync which is activated at the start of the standard PBX back plane time slots. This modified frame sync is activated at the start of time slot 31, instead of between time slots 31 and 0 (62.5 microseconds before normal frame sync). This allows the DSP's 56 ample time to prepare for the start of a new frame.

Each DSP 56 obtains program data (the operating algorithm) from the processor 50 through its IDMA port. The processor 50 first generates a DSP chip select at an address indicating that the chip 56 is available. The address, in the form of data, is latched when the bus cycle of the PBX back plane 20 is complete, after which data is then written or read from the DSP. Internal registers are accessed using this method as well. The system also may be designed with each of the DSP's 56 having their own chip select in conjunction with address location, which selects all the DSPs 56 at once. Resets then are controlled through a register which can be used to assert or de-assert resets on any combination of DSP's 56. This feature allows multiple DSP's 56 to be loaded with the same program code, at the same time.

It should be noted that the RS/232 serial port 64, connected through a serial transceiver 66 to the address/data bus and control logic 52, is used only for maintenance and to initially program the data mapping for the system to set up the addresses for the DSP's, as described above. At all other times, this port is unconnected and unused in the normal operation of the system.

As indicated in FIG. 2, non-volatile memory consists of a flash memory 76, which has a portion in it reserved for the boot sector. A static RAM 74 consists of a static memory with a portion shared with the host processor 50 and with the Ethernet controller 62 DMA memory space. Programming the flash memory 76 is accomplished with the use of the boot block programming connector (BBPC) which contains a storage in EPROM or flash. When installed, the EPROM base address of the BBPC is defined to be separate from the flash memory base address where vectors and code then can be programmed. The BBPC with flash memory can be programmed while it is installed. When it is in the program mode, the BBPC utilizes a pre-defined address range. The primary flash and RAM address remain unchanged, allowing the BBPC to be programmed by the primary flash.

The DUART 68 provides an interface between the host processor 50 and an external terminal by way of the RS-232 driver configured for the DCE mode. As noted above, this port 64 is only used during maintenance and initial programming of the DSP's 56 on the card 30. As stated previously, the DUART also provides status and/or control registers for the LED's indicative of "on-line" and "make busy", cross point, card ID, flash, and back plane interface control.

Data transfer within the interface card 30 is provided by the address/data bus control logic 52, as mentioned throughout the foregoing description. This also includes processor interrupt control for both the processor 50 that is resident on the interface card, and the processor of the system, which is coupled to the CPU card 24 shown in FIG. 1. Also included is a data/address bus with associated control logic to decode and route information to the appropriate device memory location assignment.

The foregoing description of the preferred embodiment of the invention is to be considered as illustrative and not as limiting. Other versions of the system envision the extension of data network protocols to allow a wider variety of data devices to communicate with the telephone systems. This includes gateway capabilities as defined H.323 and related standards. Because multimedia data protocols are in a constant state of flux, the design has taken into account the need for relatively frequent changes in the firmware contained in the flash memory, as well as future increases in DSP processing power. For that reason, the processing power of the individual DSP blocks 56 has not been addressed. These are standard components currently available for effecting the digital signal processing required of the system and described above. Various other modifications and changes will occur to those skilled in the art for performing substantially the same function, in substantially the same way, to achieve substantially the same result without departing from the true scope of the invention as defined in the appended claims.

What is claimed is:

1. A system for adapting a pulse code modulation (PCM) telephone system having a PBX with a back plane bus to transport information to and from a local area network (LAN) including in combination:
   an Internet protocol card (IPC) coupled to the back plane bus of a digital PBX system as a drop-in replacement for an existing digital key set card for permitting communications with a LAN-based device, the IPC comprising:
   a) a plurality of digital signal processors (DSPs) for compressing PCM voice data to packetized Internet protocol (IP) voice data and for receiving packetized IP voice data and converting it to PCM voice data;
   b) a digital cross point switch coupled in parallel with the DSPs and with the PBX back plane for routing PCM voice data to and from the DSPs and the PBX back plane;
   c) a port coupled with the LAN;
   d) a controller interconnecting selected DSPs with the LAN port for communicating packetized IP voice data on the LAN to and from the DSPs.

2. The system according to claim 1 wherein the controller includes a processor and control logic responsive to address information included with packetized IP voice data received from the LAN port and from the DSPs for interfacing the LAN port with selected ones of the DSPs.

3. The system according to claim 2 wherein the cross point switch is coupled with the controller for synchronization of the operation thereof.

4. The system according to claim 3 wherein the PBX provides operating power, timing signals and call processor resources to the Internet protocol card through the back plane bus of the PBX.

5. The system according to claim 1 wherein the cross point switch is coupled with the controller for synchronization of the operation thereof.

6. The system according to claim 1 wherein the PBX provides operating power, timing signals and call processor resources to the Internet protocol card through the back plane bus of the PBX.

7. A method for enhancing a digital PBX for a pulse code modulation (PCM) telephone system to transport information to and from a local area data network (LAN) comprising the steps of:

connecting an Internet protocol card (IPC) to the back plane bus of a PBX system, the IPC being a drop-in replacement for an existing digital key set card on the back plane for permitting communications with a LAN-based device;
coupling the IPC with the LAN;
packetizing PCM telephone signals from the PBX to packet IP data on the IPC for accessing IP devices connected to the LAN; and
converting packetized IP data from the LAN into PCM telephone signals on the IPC for processing through the PBX.

8. The method according to claim 7 further including the step of providing indicia of the status of operation of the system.

9. The method according to claim 8 wherein the step of providing indicia of the status of operation of the system comprises providing visual indicia of the status of operation of the system.

10. A system for adapting a pulse code modulation (PCM) telephone system having a PBX with a back plane bus to transport information to and from a local area network (LAN) including in combination:
   an Internet protocol card (IPC) coupled to the back plane bus of a digital PBX system as a drop-in replacement for an existing digital key set card for permitting communications with a LAN-based device, the IPC comprising:
   a) converting means for compressing PCM voice data to packetized Internet protocol (IP) voice data and for receiving packetized IP voice data and converting it to PCM voice data;
   b) switch means coupled in parallel with the converting means and with the PBX back plane for routing PCM voice data to and from the converting means and the PBX back plane;
   c) a port coupled with the LAN; and
   d) controller means interconnecting selected converting means with the port for communicating packetized IP voice data on the LAN to and from the converting means.

11. The system according to claim 10 wherein the controller means includes means responsive to address information included with packetized IP voice data received from the port and from the converting means for interfacing the port with selected ones of the converting means.

12. A communications system comprising:
   a digital PBX having a back plane bus;
   a plurality of digital key sets configured for bi-directional PCM communication with a plurality of digital key set cards coupled to the back plane bus of the PBX; and
   one or more Internet Protocol (IP) key sets configured for bi-directional packet IP communication with an IP card coupled to the back plane bus of the PBX, the IP card configured as a drop-in replacement card for at least one of the digital key set cards and for converting PCM communication to packet IP communication and vice versa, wherein the IP key set and the IP card replace one of the digital key sets and one of the digital key set cards, respectively.

13. The system of claim 12 wherein the IP card comprises a plurality of DSPs for converting PCM communication to packet IP communication and vice versa.

14. The system of claim 13 wherein the DSPs are connected in parallel with a PCM highway.

15. A method for replacing a synchronous data-type telephone with a packet data-type telephone in a digital PBX system, the system of the type having a plurality of synchronous data-type telephones communicating with the PBX via a plurality of digital cards connected to a back plane bus of the PBX, the method comprising:

removing one of the digital cards connected to the back plane bus of the PBX, thereby severing communications between the synchronous data-type telephone and the PBX system;

installing an IP card in the same location as the removed digital card using the same physical connections on the back plane bus of the PBX;

coupling the packet data-type telephone to a packet network;

receiving packet data from the packet data-type telephone at a packet port of the IP card and receiving synchronous data at a backplane interface;

converting received packet data to synchronous data and converting received synchronous data to packet data within the IP card; and routing converted data to permit bi-directional communication within the system, whereby, the method is repeated for replacement of additional synchronous data-type telephones with packet data-type telephones, and operation of the digital PBX system is not disrupted or altered as a result of one or more replacements, thereby permitting the synchronous data-type telephones and the packet data-type telephones to co-exist on the same digital PBX system.

16. The method of claim 15 wherein receiving packet data comprises Ethernet packet data.

\* \* \* \* \*